United States Patent
Luboschik

(10) Patent No.: US 7,424,982 B2
(45) Date of Patent: Sep. 16, 2008

(54) DEVICE FOR TUNING AND TRANSLATING A PASTY OR GRANULAR MATERIAL

(75) Inventor: Ulrich Luboschik, Kandern-Wollbach (DE)

(73) Assignee: Degremont, Rueil-Malmaison (FR)

( * ) Notice: Subject to any disclaimer, the term of this patent is extended or adjusted under 35 U.S.C. 154(b) by 0 days.

(21) Appl. No.: 11/574,149

(22) PCT Filed: Aug. 22, 2005

(86) PCT No.: PCT/FR2005/002119

§ 371 (c)(1),
(2), (4) Date: Oct. 18, 2007

(87) PCT Pub. No.: WO2006/024794

PCT Pub. Date: Mar. 9, 2006

(65) Prior Publication Data

US 2008/0078852 A1 Apr. 3, 2008

(30) Foreign Application Priority Data

Aug. 24, 2004 (FR) .................................. 04 09069

(51) Int. Cl.
*A01F 29/00* (2006.01)
*B02B 5/02* (2006.01)
*B02C 19/00* (2006.01)
*B03B 7/00* (2006.01)

(52) U.S. Cl. .................. 241/101.4; 241/260.1
(58) Field of Classification Search ............... 241/101.4, 241/260.1
See application file for complete search history.

(56) References Cited

U.S. PATENT DOCUMENTS

| 3,580,517 A | * | 5/1971 | Ehrlich | 241/186.4 |
| 3,612,129 A | * | 10/1971 | Scarborough et al. | 241/101.4 |
| 7,213,523 B2 | * | 5/2007 | Neudorf et al. | 111/121 |

FOREIGN PATENT DOCUMENTS

| DE | 43 15 321 | 11/1994 |
| DE | 298 14 380 | 12/1999 |
| EP | 1 150 083 | 10/2001 |
| FR | 1 008 631 | 5/1952 |
| FR | 2 178 280 | 11/1973 |
| FR | 2 843 958 | 3/2004 |

* cited by examiner

*Primary Examiner*—Bena Miller
(74) *Attorney, Agent, or Firm*—Connolly Bove Lodge & Hutz LLP

(57) ABSTRACT

The invention concerns a device comprising a rotary shaft (2) supported above a layer (C) of material, transversely to the translation direction (A) of the material, and means for turning (3) the material extending at least partly radially relative to the shaft (2) and rotated by said shaft to penetrate into the layer. The device comprises means for cutting (4) the layer (C) of material, radially spaced apart (g) from the rotary shaft (2) and rotated by said shaft, said cutting means (4) being located substantially on a cylindrical surface sharing a common geometrical axis with the rotary shaft, and capable, upon penetration into the layer, of fragmenting the latter, while the turning means causes the fragmented material to be granulated.

12 Claims, 2 Drawing Sheets

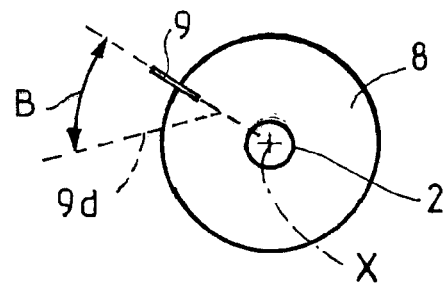
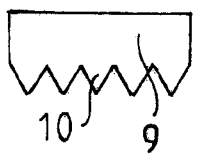 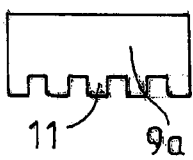 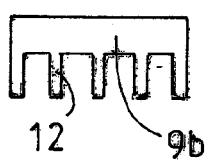 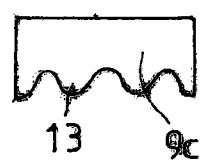
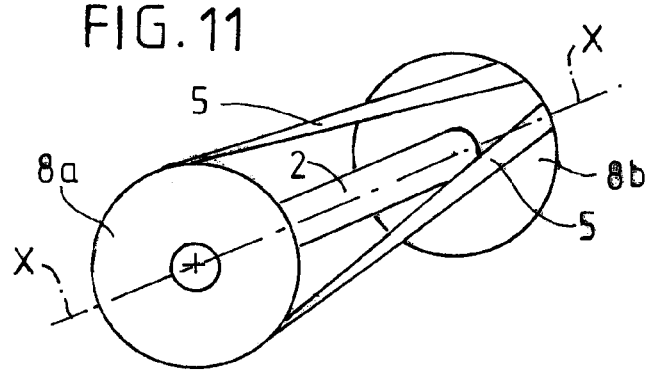

DEVICE FOR TURNING AND TRANSLATING A PASTY OR GRANULAR MATERIAL

This application is the National Stage of International Application No. PCT/FR2005/0021 19 filed on Aug. 22, 2005; and this application claims priority of application Ser. No. 04 09069 filed in France on Aug. 24, 2004 under 35 U.S.C. § 119; the entire contents of all are hereby incorporated by reference.

The invention relates to a device for turning and translating a pasty or granular material spread out in a layer, the device being of the type of those which comprise a rotary shaft supported above the layer, transversely to the translational direction of the material, and means for turning and moving the material, driven in rotation by the shaft.

The invention relates more particularly, but not exclusively, to such a device for sludge coming from stations for purifying residual urban or industrial water.

It is known, with mechanical processes such as filter presses, belt filters or centrifuges, that moist organic sludge, particularly sludge coming from the treatment of urban and industrial waste water, can only be dehydrated to a set limit value. Thus, the amount of dry matter generally lies between 15 and 30% dry content. The considerable quantity of residual water is consequently either removed, at a high cost, with the sludge, or is eliminated thermally.

Various methods and devices are known for drying moist materials. Thermal driers using contact, convection or radiation, with thin layers and with fluidized beds are the most commonly used industrial processes. Since these processes consume large quantities of energy, solar drying systems have been progressively developed and are playing an increasing part in the sludge drying market.

In embodiments of solar drying known at the present time, for example from DE 43 15 321 or from WO 2004/020922, the sludge is spread out in a glasshouse and a device ensures that it is turned over, or even transported inside said glasshouse.

By reason of thixotropy, and for dry matter contents (DM) below 25%, it has been found that, when frequently stirred and turned, sludge has the tendency to stick to the turning means of the device and to become pasty. This paste has high shear resistance which considerably increases the power necessary for turning the sludge. Moreover, aeration of the sludge mass is disrupted by this thickening, which causes an anaerobic process to be established that generates bad odors which can considerably disrupt the operation of the drying installation.

The object of the invention is especially to provide a device which no longer exhibits the disadvantages stated above or which exhibits these to a lesser degree and which in particular makes it possible to reduce the pasty nature of the sludge and therefore to reduce the force necessary and energy consumed for driving the device.

According to the invention, a device for turning a pasty or granular material spread out in a layer, in particular sludge coming from stations for purifying residual urban or industrial water, of the type previously defined, is characterized in that it comprises at least one means for cutting the layer of material, held at a radial distance from the rotary shaft and driven in rotation by this shaft, this cutting means being situated substantially on a cylindrical surface having the same geometric axis as the rotary shaft, and being able to ensure, as it penetrates the layer, fragmentation of the latter, while the turning means granulates the cut material and moves it forward.

The invention brings about a reduction that can reach up to 20% of the forces for rotating the shaft and permits good granulation of the sludge.

The cutting means comprises at least one cutting blade of which the plane is substantially tangential to said cylindrical surface.

The cutting blade preferably has a cutting edge on each of its longitudinal edges substantially parallel to the rotary shaft.

Generally, discs orthogonal to the rotary shaft are secured to this shaft and spaced in the direction of the geometric axis, and each cutting blade is fixed onto the periphery of the discs tangentially to the cylindrical surface enveloping these discs. Each cutting blade can have a symmetrical cross section.

The turning means can comprise at least one scraper comb. Preferably, the scraper comb is positioned behind the cutting blade in the direction of rotation of the rotary shaft. The scraper comb can be mounted perpendicular to the cylindrical surface or at an angle which can vary up to 90°. The scraper comb can comprise an outer radial edge that is toothed or undulated according to the desired granulation and the looked-for air-material exchange surface.

The cutting blade or blades, as well as the scraper combs, can be positioned slantwise with respect to the geometric axis of the shaft. A mounting symmetry of the blades and scraper combs is provided so as to ensure rectilinear translation of the material. The cutting blades and scraper combs provided in successive segments situated between discs orthogonal to the rotary shaft, can be offset angularly in relation to each other.

The device can include an automaton controlling in particular the speeds of rotation and of translation of the cutting blades and scraper combs, and the thickness of the material cut by the cutting blades is adjusted by the automaton.

The invention consists, apart from the arrangements set out above, of a certain number of other arrangements which will be dealt with more explicitly hereinafter as examples of embodiments described with reference to the appended drawings, but which are in no way limiting. In these drawings:

FIG. 6 is a diagram illustrating various possible positions of the turning means;

FIGS. 7 to 10 are plans of various embodiments of the scraper comb constituting the turning means; and FIG. 11 is a diagrammatic view in perspective of another alternative embodiment of the device, the turning means not having been shown.

Figure 1:
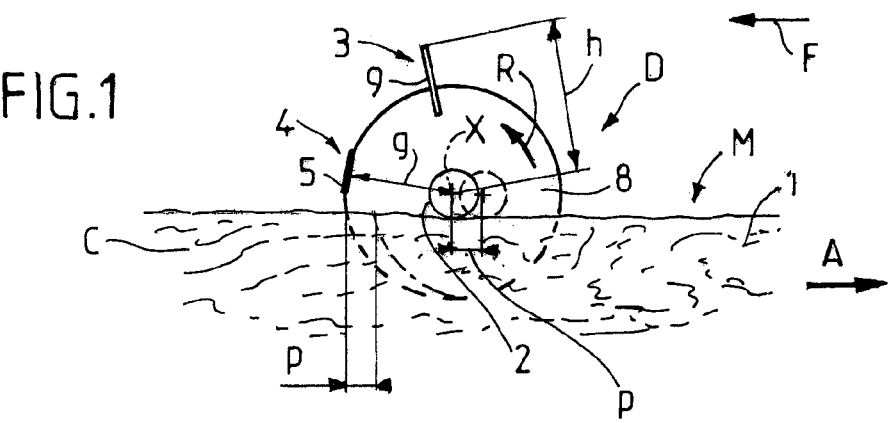
FIG. 1 is a diagrammatic vertical section of a turning device according to the invention, during work on a sludge layer.

With reference to FIG. 1 of the drawings, a device D can be seen for turning and translating a pasty material M consisting of sludge 1 coming from stations for purifying residual urban or industrial water. This example is not limiting and other granular, pasty, earthy or powdery materials can be treated with the device D of the invention.

The sludge 1 is moist and should undergo a drying treatment, advantageously solar drying. The sludge 1 is spread out and progresses in a horizontal layer C, preferably in a glasshouse (not shown).

The device D comprises a rotary shaft 2 supported above the layer C by bearings (not shown). The shaft 2 is oriented transversely, generally orthogonally, to the direction of translation A of the sludge 1.

The device D also includes a means 3 for turning the sludge 1 also ensuring its movement. The turning means 3 is generally driven in rotation in an anticlockwise direction R by the shaft 2 so as to move the sludge 1 from left to right following the arrow A on FIG. 1. The direction of rotation of the turning means 3 can be reversed from time to time, according to the particular characteristics of the sludge being treated.

The device D comprises, according to the invention, at least one means 4 for cutting the layer C of material, this means 4 being held at a radial distance g from the geometric axis X of the rotary shaft 2 and being driven in rotation by this shaft. The cutting means 4 is substantially situated on a cylindrical surface of revolution having the same geometric axis X as the shaft 2. The cutting means 4 is able to ensure, as it rotates and penetrates the layer C, fragmentation of the latter, while the turning means 3 moves the slice of cut sludge and granulates it.

The cutting means 4 is advantageously formed of a cutting blade 5 of which the plane is substantially tangential to a cylindrical surface of revolution with an axis X-X.

Several blades 5 can be distributed angularly about the geometric axis X-X, while remaining tangential to the cylindrical surface.

Figure 3:
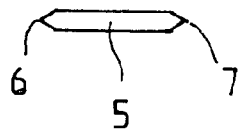
FIG. 3 is a cross section on a larger scale of a cutting blade with two cutting edges.

Preferably, the edges of the cutting blades are ground on both sides of the blade. A cutting blade 5, as illustrated in FIG. 3, then has a cutting edge on each of its longitudinal edges 6, 7 parallel to the axis X-X. According to the example of FIG. 3, the cross section of the blade 5 is rectangular and the two longitudinal edges 6, 7 have a cross section in the form of a dihedron of which the edge constitutes the cutting edge.

Figure 4:
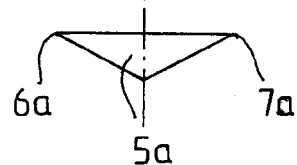
FIGS. 4 and 5 are cross sections of alternative embodiments of the cutting blade.

FIG. 4 illustrates a variant according to which the blade has a cross section in the form of an isosceles triangle of which the base is turned radially outwards with respect to the axis X-X. The edges 6a, 7a of the base constitute the cutting edges of the blade 5a.

Figure 5:
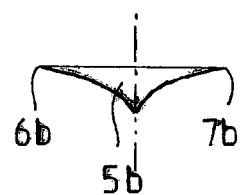

FIG. 5 shows another variant according to which the blade 5b has a flat face turned outwards and two concave faces turned radially inwards, symmetrical with respect to the median plane of the flat face. The cutting edges are formed by the edges 6b, 7b.

With the cutting edges 5, 5a, 5b having a cutting edge on each side, the device D can be translated and worked downstream as well as upstream to the installation, that is to say towards the right or left in FIG. 1.

Generally, the device D comprises discs 8 (FIG. 1) or 8a, 8b, 8c (FIG. 2) centered on the geometric axis X-X and orthogonal to the shaft 2 to which they are secured, in particular by welding. The discs 8, 8a, 8b, 8c are spaced along the direction of the axis X-X. Two successive discs such as 8a, 8b (FIG. 2) determine a segment between them. Each cutting blade 5 is fixed onto the periphery of the discs, tangentially to the cylindrical surface enveloping the discs 8, 8a-8c. The shape of the device D with discs 8, 8a-8c recalls that of a drum of which the cylindrical wall is removed except for zones corresponding to the blades 5.

Figure 2:
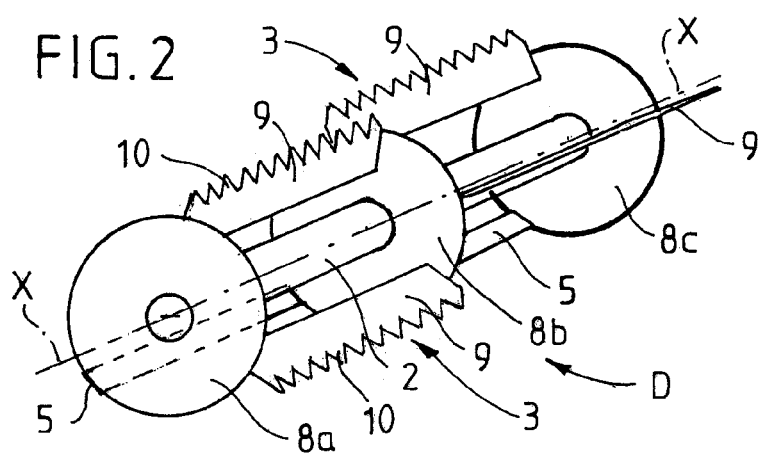
FIG. 2 is a diagrammatic view in perspective of an alternative embodiment of the turning device.

The device D may be monocoque, corresponding to a single segment, or be composed of several successive segments. In FIG. 2, two segments are determined by the three discs 8a, 8b, 8c so as to increase the mechanical strength of the device and to provide fixing points to the cutting blades 5 and to the turning means 3. There is a minimum of one cutting blade 5 and one turning means 3 per monocoque or per segment.

The turning means 3 is advantageously formed of a scraper comb 9 generally oriented in the radial direction with respect to the axis X, namely perpendicular to the cylindrical surface tangential to the blades 5. The comb 9 consists of a small plate fixed at each end to a disc such as 8a, 8b, in particular by welding. The outer radial edge of the comb 9 has teeth 10 with a triangular shape according to FIG. 2 and FIG. 7. The points of the teeth 10 are situated at a radial distance h (FIG. 1) from the axis X. According to FIG. 1, the distance h is greater than the distance g of the blades 5 to the axis X. It would be possible to mount the blades 5 at a distance g equal to or greater than h.

FIGS. 8, 9 and 10 show alternative embodiments of scraper combs 9a, 9b, 9c with, respectively, teeth 11 with a substantially square shape, 12 with an elongated rectangular shape and 13 with a rounded shape.

The depth of the space between the teeth and the separation of the teeth are chosen according to the type of sludge 1 to be treated and the desired sludge-air contact surface.

As a variant, the scraper combs can be mounted as illustrated in 9d in FIG. 6, at an angle B with respect to the radial direction. This angle B can reach 90°. 2

Preferably, the turning means 3, in particular the scraper comb 9, is positioned behind the cutting blade 5 in the direction of rotation R of the rotary shaft 2, as can be seen in FIG. 1. The rearward angular offset of the scraper comb 9 with respect to the blade 5 is generally less than 90°.

The cutting blades 5 can be mounted slantwise with respect to the axis X as illustrated in FIG. 11. The scraper combs 9-9c (not shown) can also be mounted slantwise with respect to the axis X. In this case, in order to ensure rectilinear translation of the sludge, either a mounting symmetry is provided about the center of the segment for elements such as the cutting blades 5 and the combs 9 carried by a segment, or a mounting symmetry of two successive segments with respect to the plane of separation orthogonal to the geometric axis.

In order to provide better distribution of mechanical forces along a device D consisting of several segments, the blades 5 and combs 9 of a segment are offset angularly with respect to those of the adjacent segment as illustrated in FIG. 2.

The bearings of the shaft 2 can be mounted fixed with respect to a frame. Preferably, the bearings of the shaft 2 are mounted so as to move in translation, for example in the direction of the arrow F of FIG. 1, under the action of drive means (not shown). Under these conditions, when the blade 5 regains the same angular position after having completed one revolution, the shaft 2 has moved a distance p from the position shown by dashes in FIG. 1 to the position shown by a solid line. The distance p corresponds to the separation between the trajectories of the blade 5 after a complete revolution of the shaft 2. This distance p corresponds to the thickness of the slice of material cut by the blade 5. These explanations are provided in the case where a single blade 5 is provided per segment. When several blades 5 are distributed over the circular periphery, the thickness of the slice depends on the angular distance between two successive blades.

On account of the fact that the cutting blades 5 are mounted tangentially to the cylindrical surface with an axis X, a slice of sludge is taken without undergoing a translational movement.

This being so, the operation and use of the device are as follows.

In order to ensure that the sludge 1 is turned and translated, the rotational drive of the shaft 2 is controlled in an anticlockwise direction R, by means of a motor (not shown). The means for driving the shaft 2 in translation in the direction of the arrow F is also put into action.

The cutting blades 5 penetrate the sludge 1 and cut it into successive layers. At each rotation of the drum, each cutting blade 5 cuts the sludge over a set thickness p depending on the speed of rotation of the shaft 2, of the rate of movement following the arrow F and the number of blades 5 distributed over the periphery. The scraper comb or combs 9 which come behind the blade 5 move the cut slice of sludge in the direction of the arrow A and granulate it. The scraper combs turn the material, aerate it, move it forward and granulate it.

An automaton is advantageously provided to vary the speeds of rotation and of translation and therefore the cutting thickness p.

Such a device is particularly suitable for an installation intended for solar drying and wind drying and for the incorporation and mixing of earth or compost into soil improvers or fertilizers.

According to the invention, the sludge is not only pressed down by the turning means 3, but is cut and brought back to the surface by the cutting means 4. Thus, instead of forming a pasty mass, the sludge becomes granulated. By increasing the surface area of the cutting section, aeration of the sludge is improved, which prevents the appearance of anaerobic zones and therefore of bad odors which accompany these.

The invention claimed is:

1. A device for turning and translating a pasty or granular material (M) spread out in a layer (C), in particular sludge (1) coming from a station for purifying residual urban or industrial water, comprising a rotary shaft (2) supported above the layer of material, transversely to the translational direction of the material, a means (3) for turning the material, extending at least partially radially with respect to the shaft (2) and driven in rotation by this shaft in order to penetrate the layer, and a means (4) for cutting the layer (C) of material, held at a radial distance (g) from the rotary shaft (2) and driven in rotation by this shaft, characterized in that the cutting means (4) comprises at least one cutting blade (5) of which the plane is substantially tangential to a cylindrical surface having the same geometric axis as the rotary shaft, and being able to ensure, as it penetrates the layer, fragmentation of the latter, while the turning means granulates the cut material and moves it forward.

2. The device as claimed in claim 1, wherein the cutting blade (5, 5a, 5b) has a cutting edge on each of its longitudinal edges substantially parallel to the rotary shaft.

3. The device as claimed in claim 1 wherein discs (8; 8a, 8b, 8c) orthogonal to the rotary shaft (2) are secured to this shaft and spaced in the direction of the geometric axis, and each cutting blade (5) is fixed onto the periphery of the discs tangentially to the cylindrical surface enveloping these discs.

4. The device as claimed in claim 1, wherein each cutting blade (5) has a symmetrical cross section.

5. The device as claimed in claim 1, wherein the turning means (3) comprises at least one scraper comb (9).

6. The device as claimed in claim 5, wherein the scraper comb (9) is positioned behind the cutting blade (5) in the direction of rotation (R) of the rotary shaft.

7. The device as claimed in claim 5, wherein the scraper comb (9) comprises an outer radial edge that is toothed or undulated according to the desired granulation and the looked-for air-material exchange surface.

8. The device as claimed in claim 5, wherein the scraper comb (9) is mounted perpendicular to the cylindrical surface or at an angle (B) which can vary up to 90°.

9. The device as claimed in claim 5, wherein the cutting blades (5) and the scraper combs (9) are positioned slantwise with respect to the geometric axis (X-X) of the shaft (2).

10. The device as claimed in claim 9, wherein a mounting symmetry of the blades and scraper combs is provided so as to ensure rectilinear translation of the material (M).

11. The device as claimed in claim 5, wherein the cutting blades (5) and scraper combs (9) provided in successive segments situated between discs (8a,8b,8c) orthogonal to the rotary shaft (2), are offset angularly in relation to each other.

12. The device as claimed in claim 5, wherein it includes an automaton controlling in particular the speeds of rotation and of translation of the cutting blades (5) and scraper combs (9), and in that the thickness (p) of the material cut by the cutting blades (5) is adjusted by the automaton.

* * * * *